US011122648B1

(12) United States Patent
Troxel

(10) Patent No.: US 11,122,648 B1
(45) Date of Patent: Sep. 14, 2021

(54) SYSTEMS AND METHODS FOR PROVIDING PROCESSING DIVERSITY TRANSPONDER SIGNALS WITH DISTRIBUTED ELECTRONICS

(71) Applicant: Aviation Communication & Surveillance Systems, LLC, Phoenix, AZ (US)

(72) Inventor: James Roy Troxel, Glendale, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 0 days.

(21) Appl. No.: 15/930,211

(22) Filed: May 12, 2020

Related U.S. Application Data

(60) Provisional application No. 62/847,089, filed on May 13, 2019.

(51) Int. Cl.
  *H04W 88/08* (2009.01)
  *H04B 1/3805* (2015.01)
  *H04B 1/00* (2006.01)

(52) U.S. Cl.
  CPC ........ *H04W 88/085* (2013.01); *H04B 1/0064* (2013.01); *H04B 1/0075* (2013.01); *H04B 1/3805* (2013.01)

(58) Field of Classification Search
  CPC . H04W 88/085; H04B 1/0064; H04B 1/0075; H04B 1/3805
  See application file for complete search history.

(56) References Cited

U.S. PATENT DOCUMENTS

| 6,788,245 | B1* | 9/2004 | Johnson | G01S 13/765 |
| | | | | 342/32 |
| 6,864,830 | B1* | 3/2005 | Billings | G01C 5/005 |
| | | | | 342/120 |
| 2007/0080849 | A1* | 4/2007 | Brandley | H04L 27/2331 |
| | | | | 342/51 |

* cited by examiner

*Primary Examiner* — Nguyen T Vo
(74) *Attorney, Agent, or Firm* — Dickinson Wright PLLC

(57) ABSTRACT

A distributed antenna system of an aircraft includes first and second antennas and corresponding first and second remote transceiver units (RTUs). Each RTU receives a radio signal from the corresponding antenna and includes a field-programmable gate array (FPGA)/digital signal processor (DSP). The FPGA/DSP of a second RTU receives a second signal corresponding to the radio signal from the second antenna and receives a first signal from the first RTU corresponding to the radio signal from the first antenna. The FPGA/DSP of a second RTU determines which of the first and second antennae will transmit a reply to an interrogation included in the radio signals from the first and second antennae, based on a comparison of the first signal and the second signal.

15 Claims, 3 Drawing Sheets

SYSTEMS AND METHODS FOR PROVIDING PROCESSING DIVERSITY TRANSPONDER SIGNALS WITH DISTRIBUTED ELECTRONICS

CROSS-REFERENCE TO RELATED APPLICATION

This application claims the benefit of U.S. Provisional Application No. 62/847,089, filed May 13, 2019 in the United States Patent and Trademark Office.

BACKGROUND

Apparatuses and methods consistent with exemplary embodiments relate to a distributed antenna system and a method thereof.

SUMMARY

Exemplary embodiments may address at least the above problems and/or disadvantages and other disadvantages not described above. Also, exemplary embodiments are not required to overcome the disadvantages described above, and may not overcome any of the problems described above.

One or more exemplary embodiments may provide a distributed antenna system comprising: a first remote transceiver unit (RTU) connected to a first antenna and comprising a first field programmable gate array (FPGA)/digital signal provider (DSP) configured to receive a first digital intermediate frequency (IF) signal, corresponding to a first RF signal comprising an interrogation, from the first antenna. The system further comprises a second RTU connected to a second antenna and comprising a second FPGA/DSP configured to receive a second digital IF signal, corresponding to a second RF signal, comprising the interrogation, from the second antenna. The second RTU is also configured to receive the first digital IF signal. The second FPGA/DSP comprises comparison logic configured to determine which of the first antenna and the second antenna will transmit a reply to the interrogation, based on a comparison of the first digital RF signal and the second digital RF signal.

The first RTU may further comprise a first receiver, connected to the first antenna and configured to receive the first RF signal from the first antenna; and the second RTU further may further comprise a second receiver, connected to the second antenna and configured to receive the second RF signal from the second antenna.

The first and second receivers may be 1030 MHz receivers.

The second RTU may further comprise a supplemental receiver configured to receive, from the first RTU, a signal corresponding to the first RF signal and configured to output, to the second FPGA/DSP, the first digital IF signal.

The first receiver may be further configured to output the first digital IF signal to the second FPGA/DSP.

The second FPGA/DSP may be further configured to output, to the first FPGA/DSP a control signal configured to control the first FPGA/DSP to output a reply to the interrogation via the first antenna.

One of the first antenna and the second antenna may comprise a top antenna, and another of the first antenna and the second antenna may comprise a bottom antenna According to an aspect of another example embodiment, a distributed antenna system comprises a first RTU connected to a first antenna and comprising a first FPGA/DSP configured to receive a first digital IF signal, corresponding to a first RF signal, comprising an interrogation, from the first antenna. The system further comprise a second RTU connected to a second antenna and comprising a second FPGA/DSP configured to receive a second digital IF signal, corresponding to a second RF signal, comprising the interrogation, from the second antenna. The system further comprises a remote FPGA/DSP configured to receive a first signal corresponding to the first RF signal and to receive a second signal corresponding to the second RF signal. The remote FPGA/DSP comprises comparison logic configured to determine which of the first antenna and the second antenna will transmit a reply to the interrogation.

According to an aspect of another example embodiment, a method of response to an interrogation received by a distributed antenna system, comprises receiving, from a first antenna, a first RF signal, comprising an interrogation, at a first RTU; receiving, from a second antenna, a second RF signal, comprising the interrogation, at a second RTU disposed apart from the first RTU; at a FPGA/DSP, receiving a first digital IF signal, corresponding to the first RF signal and receiving a second digital IF signal, corresponding to the second RF signal; and the FPGA/DSP determining which of the first antenna and the second antenna will transmit a reply to the interrogation, based on a comparison of the first digital RF signal and the second digital RF signal.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
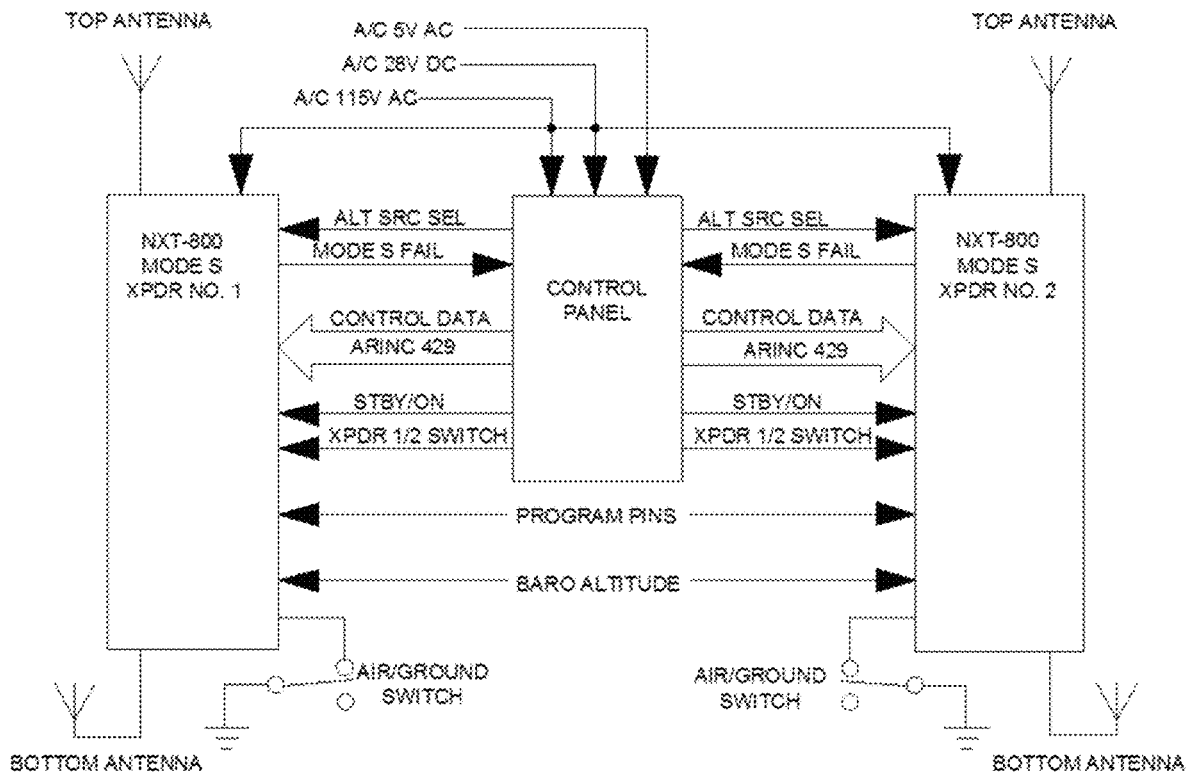
FIG. 1 is a related art antenna system.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

One or more example embodiments may provide a distributed set of electronics for a transponder system that implements diversity operation. Two antennas may be located on an aircraft—one antenna located on the top of the fuselage and one antenna located on the bottom of the fuselage. However, there may be more than two antennae, and they may be located in positions other than the top and bottom of the fuselage.

One issue associated with such architecture is an ability to determine the antenna from which a reply to an interrogation should be transmitted. The requirements for transmission of such a reply are set forth in Radio Technical Commission for Aeronautics (RTCA) DO-181E (which is incorporated herein by reference in its entirety), and are implemented by comparison logic. The requirements of RTCA DO-181E specify a comparison of a time of arrival of the interrogation at each antenna, as well as a comparison of the amplitudes received at each antenna. For each antenna, the comparison logic receives a time of arrival and an amplitude of arrival of a received interrogation, and uses this information to determine from which antenna a reply should be transmitted. For example, the times of arrival of an interrogation at the antennae is compared. If the times of arrival are both within a window of, for example, 125 nanoseconds, the signals are considered as arriving substantially simultaneously. The amplitudes of the received signals are then compared, and the antenna having received the greater amplitude is used to transmit a reply. The signal strength threshold may be 3 dB. If the times of arrival are distinct enough to be outside of another window, for example a difference of time of arrival of about 375 nanoseconds or more, the antenna having received the signal later is considered to have received a multi-path signal. In that case, the antenna having the earlier time of arrival is used to transmit a reply.

In the related art, comparison logic, as well as antenna circuitry including a receiver/transponder for each antenna, may be implemented by a single line-replaceable unit (LRU), disposed at a distance from, and connected to each antenna. In such a related art system, the RF signal, or a converted digital signal is transmitted, typically via a coaxial cable, from each antenna to the LRU. This often results in a cable loss between the antenna and the LRU. For example, up to half the power of a signal itself may be lost in the cable, thus necessitating higher power and more expensive transmitters.

One solution is to provide a distributed antenna system in which the electronics for each antenna is located adjacent to the antenna itself. Such a system may be used, in place of a system with long coaxial cables connecting each antenna to a centrally-located single LRU, in order to avoid the long coaxial runs which may result in a loss of power and sensitivity. For example, such a distributed system may be used in an urban air mobility (UAM) vehicle.

A possible problem with such a distributed system arises with respect to an interrogation requiring a reply within a very short period of time. In the case of an air traffic control radar beacon system (ATCRBS) interrogation, a transponder must wait until after the leading edge of a P4 pulse to determine what type of reply needs to be generated. If no P4 pulse is present, then an ATCRBS replay must be transmitted within 1.5 us of the leading edge of where the P4 pulse would occur. If a P4 pulse is present, either no reply, or a Mode S reply, which is delayed 128 µs, is transmitted. Therefore, a case in which an ATCRBS interrogation is received without a P4 pulse is a critical timing case. Thus, a problem may arise with respect to the requirement of a reply being transmitted within 1.5 µs of where the leading edge of the P4 pulse would be. This might not be possible in certain situations in a distributed system.

One or more example embodiments may provide a system and method of implementing a diversity transponder function in a system with distributed electronics. The system may include electronics, which are associated with each antenna, as shown for example, by the remote transceiver units (RTU) for the top and bottom antennae, in FIG. 2. The system may also include a remote unit, such as an Integrated Modular Avionics (IMA) unit or a mission computer, as shown in FIG. 3, which could reside in a location separate from the locations of the top and bottom antennae, such as an electronics bay.

Figure 2:
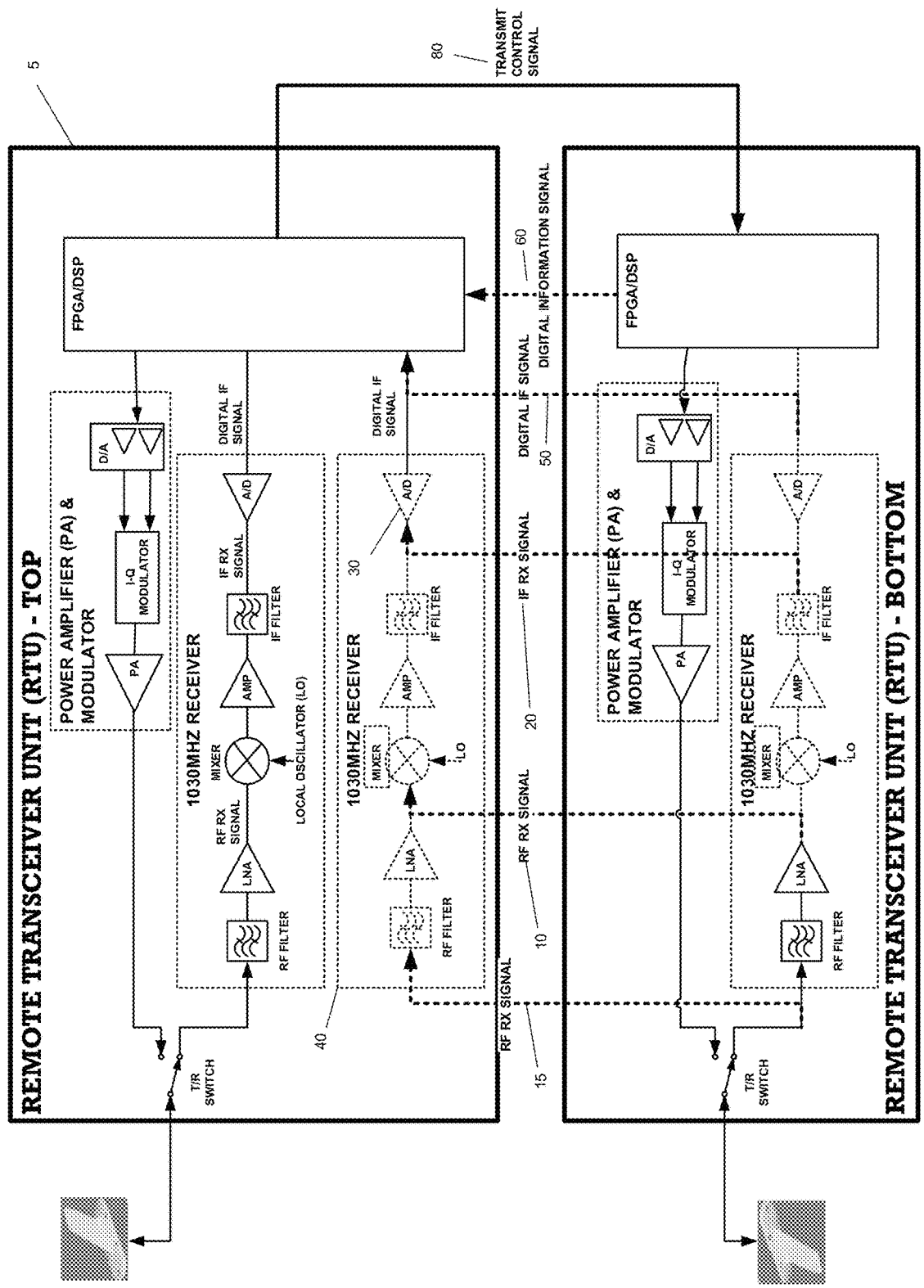
FIG. 2 is a distributed antenna system according to an example embodiment.

FIG. 2 illustrates a distributed antenna system according to an example embodiment. As illustrated a first/bottom antenna may be connected to a first/bottom RTU, and a second/top antenna may be connected to a second/top RTU. As illustrated, an RF signal from an antenna may be provided to a receiver including a mixer/local oscillator (LO) and an A/D converter. However, according to another example aspect, a digital RF signal may be provided from an antenna without the use of the mixer/LO and A/D converter. According to yet another example aspect, an analog receiver may comprise an A/D converter that digitizes a base-band video signal after an RF detector (not shown).

As shown in FIG. 2, the output of a first one of the RTU 1030 MHz receivers, either the radio frequency (RF) 10 or 15, or intermediate frequency (IF) output 20, may be provided to the second RTU as an input. In the example of FIG. 2, the output of one of the Bottom RTU receivers is output to the Top RTU as an input. The second RTU 5 may process the signal received from the first RTU using a receiver demodulator which may include an analog-to-digital (A/D) 30 along with its own 1030 MHz receiver channel. This may allow the diversity amplitude and time of arrival of the signal from both antennae ports to be compared by the second RTU 5. A transmit control signal 80 may be provided to the first RTU from the second RTU 5 if the determination is made to reply to an interrogation via the antenna connected to the first RTU. The RF and IF signals and the control signal may each be provided in any one of a number of different medias, such as via a coaxial cable, a fiber optic cable, a wireless link, or any other format as would be understood by one of skill in the art.

Figure 3:
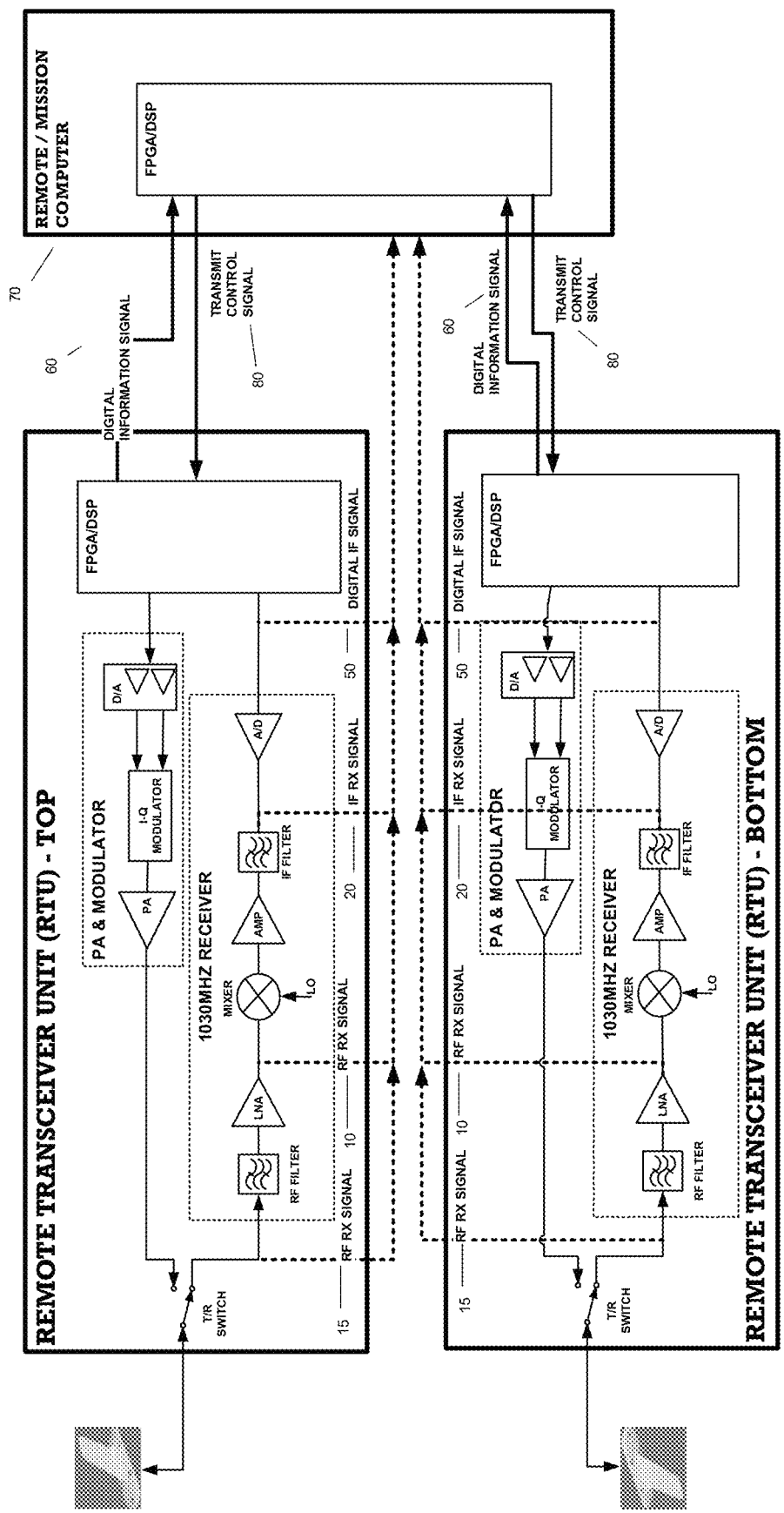
FIG. 3 is a distributed antenna system according to another example embodiment.

FIG. 3 illustrates a distributed antenna system according to another example embodiment. As an alternative to the arrangement illustrated in FIG. 2, as shown in FIG. 3, both RTUs may provide their RF 10 or 15 and IF 20 signals to a third unit, such as a remote/mission computer 70, which could perform the diversity comparison, as described above. The third unit 70 could provide a transmit control signal 80 to the selected RTU on which a reply to the interrogation should be generated. The third unit may be disposed adjacent to one of the first RTU and the second RTU, or in another location on the aircraft, such as in an electronics bay.

According to a distributed antenna system according to another example embodiment, the RF and IF signals may be digitized and the digitized signal, e.g. signal 50 in FIG. 2, may be provided to the second RTU or to the third remote/mission computer on a digital data bus. This embodiment may have the advantage of eliminating any potential problem associated with analog signals, such as calibration, high intensity radiated field (HIRF) and lightning susceptibility. The digitized signal could be a video signal after filtering and demodulation of the digitized IF or RF signal, e.g. as signal 60, of FIG. 2.

According to a distributed antenna system according to another example embodiment, a digital signal, such as described above, may also contain information about the received data, such as pulse amplitude, and timing data. For example, each demodulated interrogation pulse could be provided across a data bus which may specify the timing and amplitude of the pulse, e.g. as signal 60 of FIG. 2.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A distributed antenna system comprising:
a first remote transceiver unit (RTU) connected to a first antenna and comprising a first field programmable gate array (FPGA)/digital signal provider (DSP) configured to receive a first digital intermediate frequency (IF) signal, corresponding to a first RF signal, comprising an interrogation, from the first antenna;
a second RTU connected to a second antenna and comprising:
a second FPGA/DSP configured to receive a second digital IF signal, corresponding to a second RF signal, comprising the interrogation, from the second antenna and to receive the first digital IF signal;
wherein the second FPGA/DSP comprises comparison logic configured to determine which of the first antenna and the second antenna will transmit a reply to the interrogation, based on a comparison of the first digital RF signal and the second digital RF signal.

2. The system of claim 1, wherein:
the first RTU further comprises a first receiver, connected to the first antenna and configured to receive the first RF signal from the first antenna; and
the second RTU further comprises a second receiver, connected to the second antenna and configured to receive the second RF signal from the second antenna.

3. The system of claim 2, wherein the first receiver is a first 1030 MHz receiver and the second receiver is a second 1030 MHz receiver.

4. The system of claim 2, wherein the second RTU further comprises a supplemental receiver configured to receive, from the first RTU, a signal corresponding to the first RF signal and configured to output, to the second FPGA/DSP the first digital IF signal.

5. The system of claim 2, wherein the first receiver is further configured to output the first digital IF signal to the second FPGA/DSP.

6. The system of claim 1, wherein the second FPGA/DSP is further configured to output, to the first FPGA/DSP a control signal configured to control the first FPGA/DSP to output a reply to the interrogation via the first antenna.

7. The system of claim 1, wherein one of the first antenna and the second antenna comprises a top antenna and another of the first antenna and the second antenna comprises a bottom antenna.

8. A distributed antenna system comprising:
a first remote transceiver unit (RTU) connected to a first antenna and comprising:
a first field programmable gate array (FPGA)/digital signal provider (DSP) configured to receive a first digital intermediate frequency (IF) signal, corresponding to a first RF signal, comprising an interrogation, from the first antenna;
a second RTU connected to a second antenna and comprising:
a second FPGA/DSP configured to receive a second digital IF signal, corresponding to a second RF signal, comprising the interrogation, from the second antenna; and
a remote FPGA/DSP configured to receive a first signal corresponding to the first RF signal and to receive a second signal corresponding to the second RF signal;
wherein the remote FPGA/DSP comprises comparison logic configured to determine which of the first antenna and the second antenna will transmit a reply to the interrogation.

9. The system of claim 8, wherein:
the first RTU further comprises a first receiver, connected to the first antenna and configured to receive the first RF signal from the first antenna; and
the second RTU further comprises a second receiver, connected to the second antenna and configured to receive the second RF signal from the second antenna.

10. The system of claim 9, wherein the first receiver is a first 1030 MHz receiver and the second receiver is a second 1030 MHz receiver.

11. The system of claim 8, wherein one of the first antenna and the second antenna comprises a top antenna and another of the first antenna and the second antenna comprises a bottom antenna.

12. The system of claim 8, wherein the remote FPGA/DSP is further configured to output, one of the first RTU and the second RTU, a control signal configured to control the transmission of a reply to the interrogation.

13. A method of response to an interrogation received by a distributed antenna system, the method comprising:
receiving, from a first antenna, a first radio frequency (RF) signal, comprising an interrogation, at a first remote transceiver unit (RTU);
receiving, from a second antenna, a second RF signal, comprising the interrogation, at a second RTU disposed apart from the first RTU;
at a FPGA/DSP, receiving a first digital intermediate frequency (IF) signal, corresponding to the first RF signal and receiving a second digital IF signal, corresponding to the second RF signal;
the FPGA/DSP determining which of the first antenna and the second antenna will transmit a reply to the interrogation, based on a comparison of the first digital RF signal and the second digital RF signal.

14. The method of claim 13, wherein the FPGA/DSP is disposed within one of the first RTU and the second RTU.

15. The method of claim 13, wherein the FPGA/DSP is spaced apart from both the first RTU and the second RTU.

* * * * *